US005186486A

United States Patent [19]

Hynds et al.

[11] Patent Number: 5,186,486

[45] Date of Patent: Feb. 16, 1993

[54] ACTIVE LINK FOR A STABILIZER BAR

[75] Inventors: Ernest J. Hynds, Meridian, Miss.; Joseph R. Marshalek, Saginaw, Mich.

[73] Assignee: General Motors Corporation, Detroit, Mich.

[21] Appl. No.: 732,888

[22] Filed: Jul. 19, 1991

[51] Int. Cl.[5] ............ B60G 17/015

[52] U.S. Cl. ............ 280/689; 74/586; 74/89.17; 267/277

[58] Field of Search ............ 280/689, 723, 707; 267/188, 189, 277, 278, 137, 140; 74/89.15, 89.17, 586, 526

[56] References Cited

U.S. PATENT DOCUMENTS

| | | | |
|---|---|---|---|
| 1,971,959 | 8/1934 | Huntman | 280/689 |
| 2,208,969 | 7/1940 | Focht | 267/11 |
| 2,400,650 | 5/1946 | Leavell | 267/137 |
| 2,929,253 | 3/1960 | Baldelli | 74/586 |
| 2,962,744 | 12/1960 | Hodgin | 74/89.17 |
| 3,003,782 | 10/1961 | Hickman | 280/112 |
| 3,029,090 | 4/1962 | Wilfert et al. | 280/124 |
| 3,337,236 | 8/1967 | Peterson | 280/124 |
| 3,396,984 | 8/1968 | Cadiou | 280/6 |
| 3,490,786 | 1/1970 | Ravenel | 280/124 |
| 4,127,269 | 11/1978 | Rest | 267/140 |
| 4,168,075 | 9/1979 | Matschinsky | 280/689 |
| 4,206,935 | 6/1980 | Sheppard et al. | 280/73 |
| 4,599,998 | 7/1986 | Castillo | 74/526 |
| 4,607,861 | 8/1986 | Eisenberg et al. | 280/702 |
| 4,630,866 | 12/1986 | McFarlane | 74/89.15 |
| 4,641,856 | 2/1987 | Reichenbach | 280/772 |
| 4,648,620 | 3/1987 | Nuss | 280/689 |
| 4,714,262 | 12/1987 | Wood | 74/586 |
| 4,815,575 | 3/1989 | Murty | 280/707 |

FOREIGN PATENT DOCUMENTS

| | | | |
|---|---|---|---|
| 364338 | of 0000 | France | 267/183 |
| 80166 | 4/1987 | Japan | 180/24.01 |
| 2-24213 | 1/1990 | Japan | 280/689 |

*Primary Examiner*—Karin L. Tyson
*Attorney, Agent, or Firm*—A. Michael Tucker

[57] ABSTRACT

A reciprocable rod link is mounted in the housing and connected to a stabilizer bar. A gear rack is provided on an outer surface of the rod link. A drive gear is rotatably mounted in the housing and meshed with the gear rack. A controller operates a drive unit to vary the resistance of the drive gear, and thus the direction and length of travel of the rod link.

5 Claims, 2 Drawing Sheets

ACTIVE LINK FOR A STABILIZER BAR

BACKGROUND OF THE INVENTION

1. Field of the Invention

The present invention relates generally to vehicular suspension systems and, in particular, is concerned with a controllable link assembly connected between a control arm and a stabilizer bar.

2. Description of the Related Art

The use of stabilizer bars in automotive suspension systems is well-known. The purpose of a stabilizer bar is to control vehicle roll during handling maneuvers (i.e., fast lane change, heavy cornering, etc.). A relatively large diameter stabilizer bar offers greater resistance to roll than a relatively small diameter bar. A drawback of a large diameter stabilizer bar is that while roll resistance is improved, ride quality decreases as impact harshness of wheel disturbances from road inputs is increased. On the other hand, a small diameter stabilizer bar inputs less impact harshness to a vehicle, but does not provide the desired roll resistance.

Generally, an end link is connected between a control arm and a stabilizer bar. Known end links are formed as either rigid or flexible elements. When the control arm moves as a result of a road input, the end link transmits all or part of the movement to the stabilizer bar. The spring effect of the stabilizer bar is then transmitted through an opposite end link to a control arm on the other side of the vehicle to resist the rolling motion of the vehicle.

The art continues to seek improvements. It is desirable to provide a stabilizer bar system having the roll resistance of a large diameter bar with a low impact harshness found in a small diameter bar or in a vehicle without a stabilizer bar. Such a system will produce superior handling and ride characteristics, without sacrificing either one, as is often done in conventional passive stabilizer bar systems.

SUMMARY OF THE INVENTION

The present invention provides an active link assembly for connecting a rotatable stabilizer bar and a pivotable control arm. The active link assembly provides a controllable link which is actively adjusted to road conditions. An active suspension system can receive sensor inputs (vehicle roll, speed, steering, etc.) at an electronic controller or computer. The controller adjusts the length or resistance to movement of the present link to produce a desired ride and handling level. The present link assembly is suitable for use with conventional stabilizer bars and control arms.

In a preferred embodiment, the present active link assembly includes a housing connected to a control arm. A reciprocable rod link is mounted in the housing and connected to a stabilizer rod. A gear rack is provided on the rod link. A drive gear is mounted in the housing and mated to the gear rack. A controller operates a drive unit to vary the resistance of the drive gear, and thus the length of the rod link between the control arm and the stabilizer bar.

DETAILED DESCRIPTION OF THE PREFERRED EMBODIMENT

Figure 1:
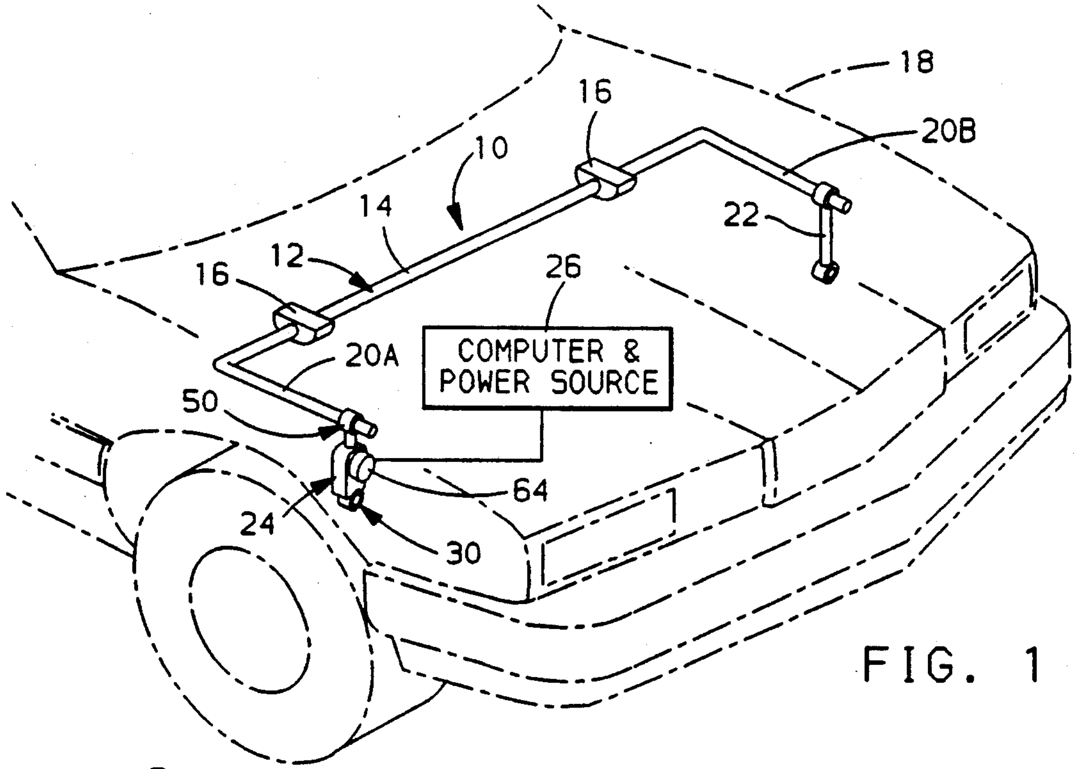
FIG. 1 is a schematic outline of a vehicle incorporating an active link according to the present invention mounted to a stabilizer bar.

A stabilizer bar system indicated generally at 10 is illustrated in FIG. 1. A stabilizer bar 12 includes a central portion 14 transversely mounted by brackets 16 in the front end of a vehicle 18. Forward projecting arms 20A, 20B of the stabilizer bar 12 are connected to wheel assemblies (not illustrated) in a well-known manner. The right arm 20B is connected by a conventional, rigid end link 22. The left arm 20A is connected by an active link assembly indicated generally at 24. The active link assembly 24 is controlled by a computer and power source 26 as described below.

Figure 2:
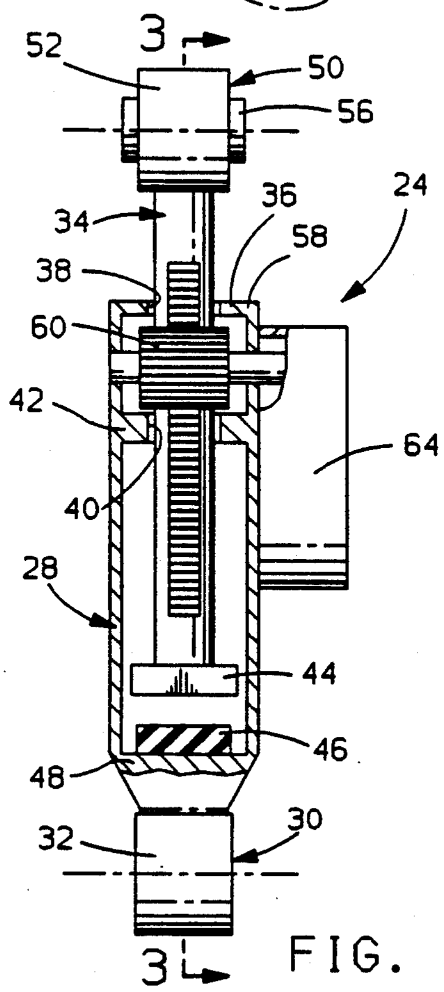
FIG. 2 is an enlarged, partly sectional view of the active link of FIG. 1 removed from the stabilizer bar.
Figure 3:
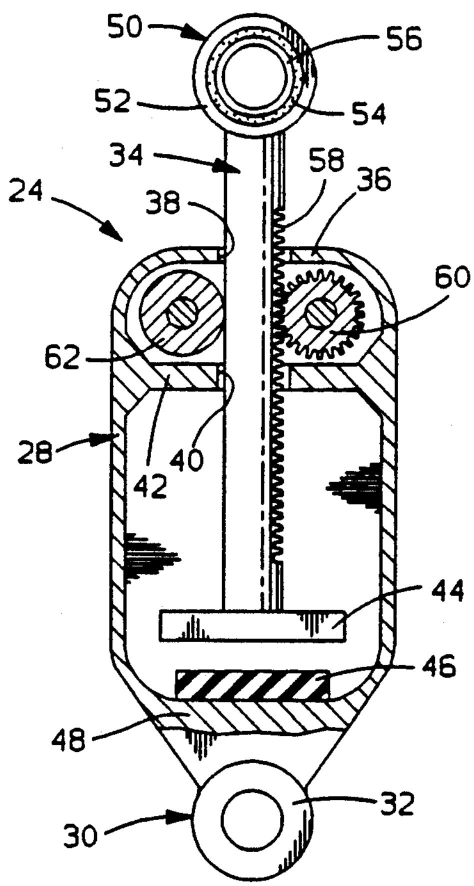
FIG. 3 is a sectional view taken along Line 3—3 of FIG. 2.

Detailed views of the active link assembly 24 are presented in FIGS. 2 and 3. The assembly 24 includes a housing 28 having an attachment element 30 at its lower surface. In the figures, attachment element 30 is shown as a barrel portion 32. However, it is appreciated that various types of attachment elements can be used.

The housing 28 receives a reciprocable link rod 34 projecting from an upper end wall 36 of the housing 28. The link rod 34 passes through respective openings 38 and 40 in the upper end wall 36 and an inner wall 42 of the housing 28. At its innermost end, the link rod 34 includes a link rod stop 44 which limits the vertical travel of the link rod 34 in the housing 28. Preferably, an elastomeric bump stop 46 is mounted on an inner surface of a lower end wall 48 to cushion the link rod stop 44. At its outermost end, the link rod 34 includes an attachment element 50. In the figures, attachment element 50 includes a barrel portion 52 mounting an elastomeric element 54 and an inner sleeve 56. It is appreciated that other types of attachment elements can be substituted for attachment element 50.

The link rod 34 includes a longitudinal gear rack 58 on its outer surface between the link rod stop 44 and the attachment element 50. A drive gear 60 is rotatably mounted in the housing 28 and meshed with the gear rack 58. A support roller 62 is rotatably mounted in the housing 28 opposite the drive gear 60 and rotatably engages the link rod 34. An electric motor-powered drive unit 64 is drivingly connected to the drive gear 60. The drive unit 64 is electrically connected to the computer and power source 26 to selectively adjust to driving conditions as described below.

Figure 4:
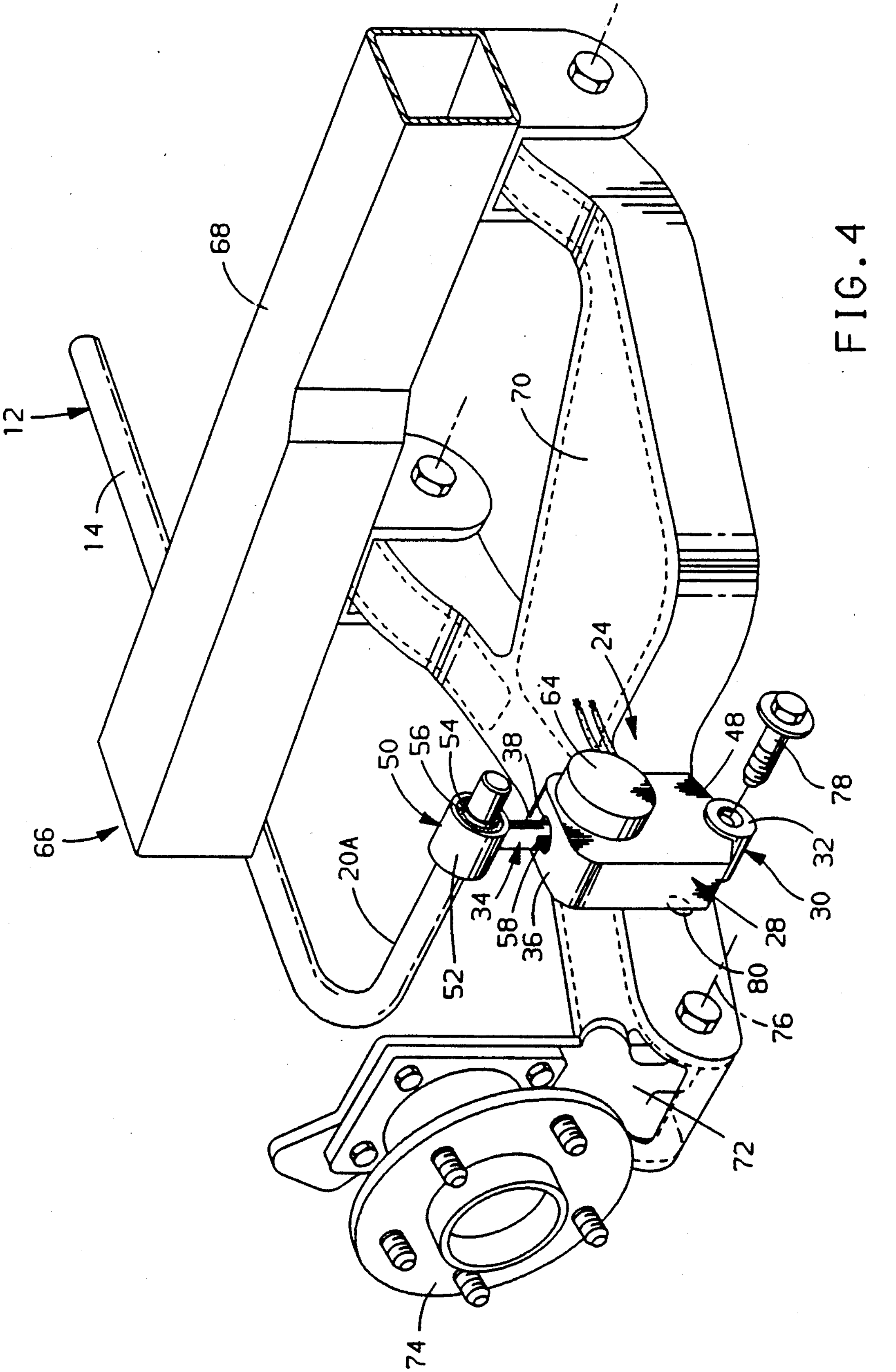
FIG. 4 is a detailed perspective view of a vehicle suspension system incorporating the active link of FIGS. 1-3 connected between a stabilizer bar and a control arm.

A mounting arrangement for the active link assembly 24 is illustrated in FIG. 4. A suspension system 66 includes a rigid frame member 68 aligned with the longitudinal axis of the vehicle 18. A control arm 70 is pivotally connected to a knuckle 72 which supports a wheel mounting assembly 74 by pivot axis 76. As a wheel (not illustrated) mounted on the wheel mounting assembly 74 travels up and down, the control arm 70 pivots with respect to the frame 68 in a well-known manner.

The active link assembly 24 is mounted between and connects the control arm 70 with the stabilizer bar 12. The lower attachment element 30 receives a fastener 78 which is threaded to a complementary opening 80 in the control arm 70. The left arm 20A of the stabilizer bar 12 is received in the sleeve of the upper attachment element.

In operation, the active link assembly 24 can absorb movement from the control arm 70 and transmit a portion of the movement to the stabilizer bar 12 to provide a desired ride. Various sensors to detect roll, speed, steering, etc., can provide inputs to the computer 26. If desired, a manual operator switch can also be provided. The computer 26 controls the speed and direction of the drive unit 64 and drive gear 60 to produce a desired rate of travel of the link rod 34.

The link assembly 24 can function in three conditions. The first condition is a "lockup state" in which the drive unit 64 is not permitted to rotate, resulting in a rigid link assembly 24. The lockup state gives the stabilizer bar system 10 a specific roll resistance to road inputs.

The second condition is a "free state" wherein the rod link 34 can travel freely in the housing 28 without resistance from the drive unit 64. The link rod stop 44 engages the inner wall 42 and the bumper 46 to limit the travel of the link rod 34. In this condition, the link assembly 24 produces an effect similar to a system not utilizing a stabilizer bar.

The third condition is an "active state" wherein the link rod 34 will vary its direction and length of travel in the housing 28 in such a way to provide a desired vehicle attitude. This condition permits the link assembly 24 to actively counteract vehicle roll during handling maneuvers and wheel impacts and improve ride and handling characteristics.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. A vehicular suspension system comprising:

(A) a control arm;

(B) a stabilizer bar; and (C) an active link assembly connecting the control arm and the stabilizer bar, including (a) a housing;

(b) a link rod reciprocally mounted in the housing;

(c) means for mounting the housing to the control arm;

(d) means for mounting the link rod to the stabilizer bar;

(e) gear means provided on the link rod;

(f) drive means mounted in the housing and meshed with the gear means; and (g) control means including a computer for variably driving the drive means to provide a desired rate and direction of travel of the link rod.

2. The system specified in claim 1 wherein the drive means comprises:

(a) a drive gear rotatably mounted in the housing and meshed to the gear means; and (b) an electric motor drivingly connected to the drive gear.

3. The system specified in claim 1 wherein the gear means comprises a gear rack on the outer surface of the link rod.

4. The system specified in claim 1 wherein the link rod includes a stop element provided at its innermost end to limit the range of travel.

5. The system specified in claim 4 including an elastomeric bump stop mounting in the housing to cushion the engagement with the link rod stop element.

* * * * *